(No Model.)
H. O. KINLOCH.
Supplementary Dash Board for Vehicles.
No. 240,732. Patented April 26, 1881.
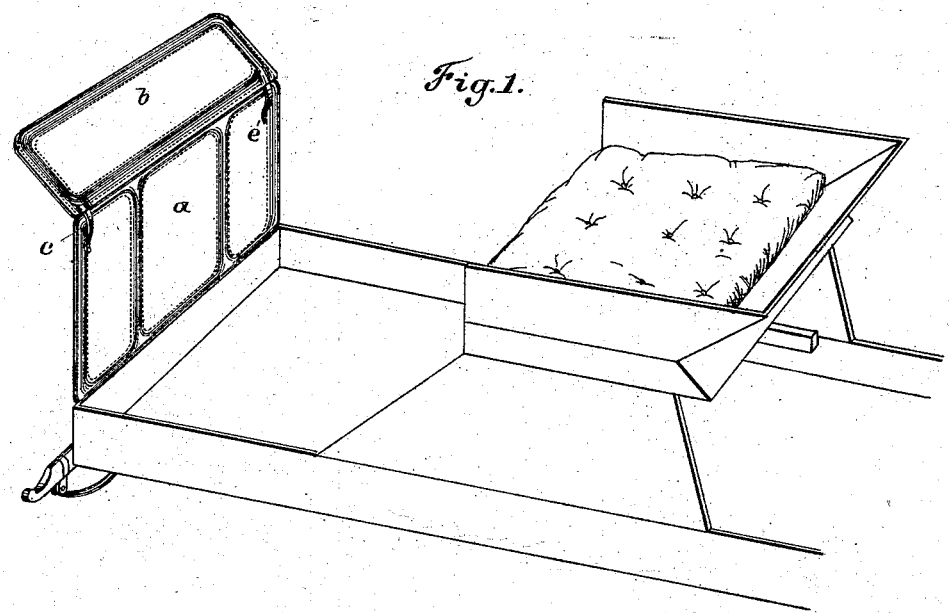
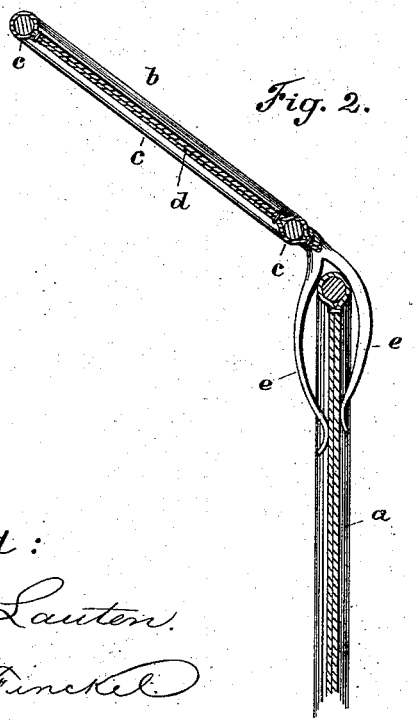
Attest:
Herm. Lauter
Geo. M. Finckel
Inventor:
Henry O. Kinloch,
by his attorney,
Wm. H. Finckel

UNITED STATES PATENT OFFICE.

HENRY O. KINLOCH, OF CHARLESTON, SOUTH CAROLINA.

SUPPLEMENTARY DASH-BOARD FOR VEHICLES.

SPECIFICATION forming part of Letters Patent No. 240,732, dated April 26, 1881.

Application filed March 5, 1881. (No model.)

*To all whom it may concern:*

Be it known that I, HENRY O. KINLOCH, a citizen of the United States, residing at Charleston, in the county of Charleston and State of South Carolina, have invented a certain new and useful Supplemental Dash-Board for Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention consists in a supplementary dash-board for removable attachment to the ordinary dash-boards of vehicles to keep out of the vehicle-body the dust, mud, &c., flung by horses in going over bad roads and in fast driving.

The invention is embodied in a rectangular or other shaped shield or fender provided with clasping or clamping devices at one edge, whereby it may be readily set and securely but removably held upon the ordinary dash-board of a vehicle at such an elevation and angle as to effectually exclude from the vehicle the dust, mud, &c., usually flung from the heels of horses in going over bad roads and in fast driving.

In the accompanying drawings, illustrating my invention, in the two figures of which like parts are correspondingly designated, Figure 1 is a perspective view of a portion of a light road-wagon body having my device applied to the dash-board; and Fig. 2 is a vertical section of the attachment and dash-board on a larger scale.

The dash-board $a$ may be of any construction.

My attachment $b$ may consist of a rectangular frame, $c$, of metal rods, covered with leather, cloth, or other material, $d$, which may correspond with the material of the dash-board.

Rigidly connected with the attachment are spring-prongs, fingers, or arms $e$, forming clips, clasps, or clamps to engage the dash-board and securely yet removably hold my attachment thereto. I prefer to so arrange these clips $e$ with relation to the attachment $b$ as that when said attachment is applied to the dash-board it shall stand off therefrom at an angle, as shown in the drawings. This arrangement will most effectually exclude the dust, mud, &c., flung by the horse's heels from the vehicle, and so protect the eyes and person of the occupant of the vehicle. The clips may form continuations of, or be welded, riveted, or otherwise attached to, the frame or other portion of the attachment $b$.

I propose to make my attachment light, and of such convenient size as that it may be stowed under the seat, for instance, of a vehicle when not desired for use. It may be made of wood, paper-board suitably stiffened, sheet metal, or other materials than those hereinbefore described.

What I claim is—

1. A supplemental detachable dash-board for vehicles, substantially as and for the purpose described.

2. The dash-board attachment $b$, provided with clips, clamps, or clasps $e$, arranged at one edge, to adapt the attachment for removable connection with the ordinary dash-board of a vehicle, substantially as and for the purpose described.

In testimony whereof I affix my signature in presence of two witnesses.

HENRY O. KINLOCH.

Witnesses:
A. R. PHILLIPS,
I. C. KINLOCH.